Sept. 30, 1941.  F. S. RUDOLPH  2,257,246
ANIMAL TRAP
Filed March 4, 1941

Inventor
FAUCETTE S. RUDOLPH
By Leech & Radul.
Attorneys

Patented Sept. 30, 1941

2,257,246

UNITED STATES PATENT OFFICE 2,257,246

ANIMAL TRAP

Faucette S. Rudolph, Yuma, Ariz.

Application March 4, 1941, Serial No. 381,737

7 Claims. (Cl. 43—81)

This invention relates to an animal trap and in particular to a trap which may be placed underground in a burrow hole or furrow for exterminating small animals such as rodents, moles, gophers, rats and the like.

One object of the invention is to construct a trap which is simple in operation, both in setting and in the removal of the entrapped animal.

Another object of the invention is to provide a trap of this character which may be economically and easily produced without expensive machinery and skilled labor.

A still further object is to provide a rugged trap of this character, having few component parts which are readily adjusted to striking position and which will render a swift killing blow when the trigger mechanism is operated.

The principles of the improved animal trap, as hereinafter described, are applicable for many types of traps, although the invention is illustrated and described as a small size trap positioned within a cylindrical container for ready disposition into an animal burrow or furrow.

Figure 1:
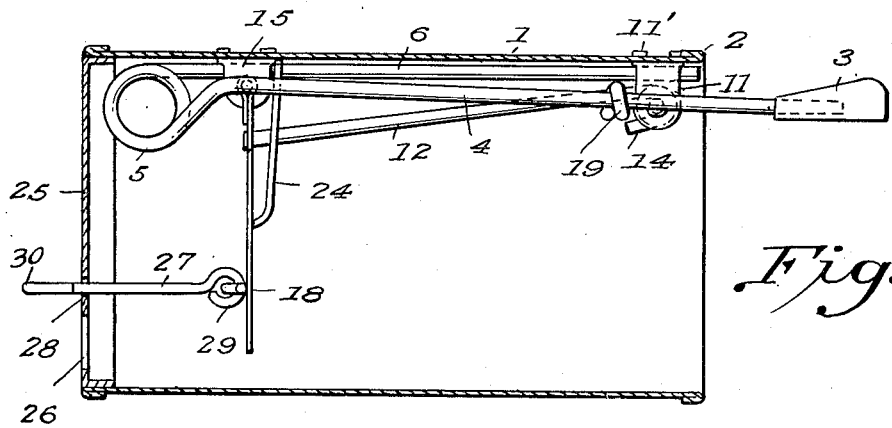
Figure 1 is a vertical section through the trap showing the trigger and strike mechanism in elevation.

More specifically, the present improved gopher or small animal trap, comprising a cylindrical casing 1, has integral turned back strengthening edges 2. The trigger and striking mechanism, as will be hereinafter described in detail, is entirely supported within and by the wall of the cylinder, and when the trap is in operative position, the mechanism hangs from the upper radius thereof.

The trap mechanism comprises a striker or hammer 3 affixed to the end of an elongated arm 4 which is the continuation of one end of a coil spring 5; the opposite end of the spring being continued into a somewhat shorter arm 6 that is secured at one or more places to the interior wall of the cylinder. A depending bifurcated bracket 10 is mounted over the free end of the arm 6 with the integral arms 11 passing through and secured at 11' to the outer wall of the cylinder, or the bracket 10 may be brazed or soldered to the interior of the cylinder with the arm 6 brazed or soldered thereto.

A trigger arm 12 is mounted on a horizontal pivot pin 13 passing through and joining the depending arms 11 of the bracket 10. To fill the space between the arms and to insure that the trigger arm 12 may pivot at the same vertical plane at all times, it is preferable to have one or more convolutions thereof encircling the pivot pin 13 with the depending end 14 thereof offset and extending parallel to the major portion of the trigger arm. The bracket 10 supporting the spring arm 6 and pivoted trigger arm 12 is mounted adjacent one end of the cylinder with the other end thereof mounted in a second bifurcated bracket 15 secured interiorally of the cylinder wall and adjacent the coil 5. The depending arms of the second bracket 15 embrace and are suitably secured around the arm 6 as well as to the cylinder 1 as previously described with relation to bracket 10.

The vertically suspended trigger release plate 18 suspended by hinge arms 21 on the ends of pivot pin 20 and carried by the depending arms of the bracket 15 is of such a size as to prevent an animal from crawling through the trap without moving the plate and thus releasing the striker arm 4.

Figure 4:
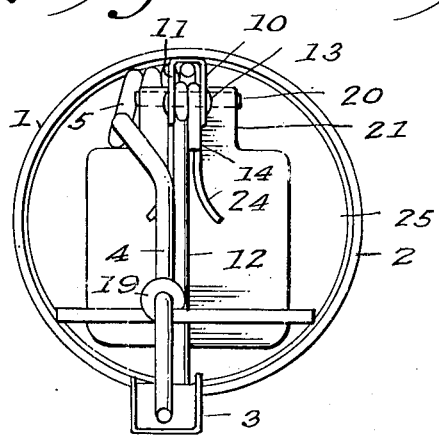
Figure 4 is an end elevation looking into the trap.
Figure 3:
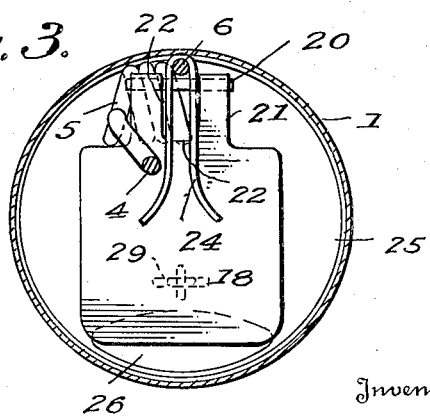
Figure 3 is a transverse section taken on line 3—3 of Figure 2, looking in the direction of the arrows.

As shown in Figure 4, the movable striker arm 4 is offset adjacent the coil 5 in such a manner that the striker arm will not contact or bind against the upper edge of the trigger release plate 18. It may be pointed out that the transverse wire or rod 19 secured to the striker arm 4 has a number of functions including the positioning of the hammer 3 in the lower position and to act as an additional striking member when the arm 4 is projected by release of the trigger mechanism as hereinafter described. The principal function of the transverse member 19, however, is for engagement with the lower depending end 14 of the trigger bar 12. As shown in Figure 1, when the trigger arm 12 and the striker arm 4 are in raised or set position, the end 14 contacts and rests against the member 19 to hold the trigger assembly in set or ready position.

Referring again to the trigger release plate 18 and trigger rod 12, it will be observed that the trigger release plate is cut away or open at 22 between the arms 21 by which it is hung from the horizontal pivot 20. This opening or slot 22 is for the purpose of supporting the extreme end of the trigger rod 12 when it is in "set" position. The depending and forwardly extending open fork 24 affixed to the inside of the cylinder acts to both guide in raising the trigger arm 12 into position for insertion and retention within the central slot 22 of plate 18 and to act as a stop to prevent the trigger release plate 18 from moving forwardly on the rod 12 as the sensitivity of the trigger release is dependent on having just the extreme end of the rod 12 bearing on the edge of the plate.

Figure 2:
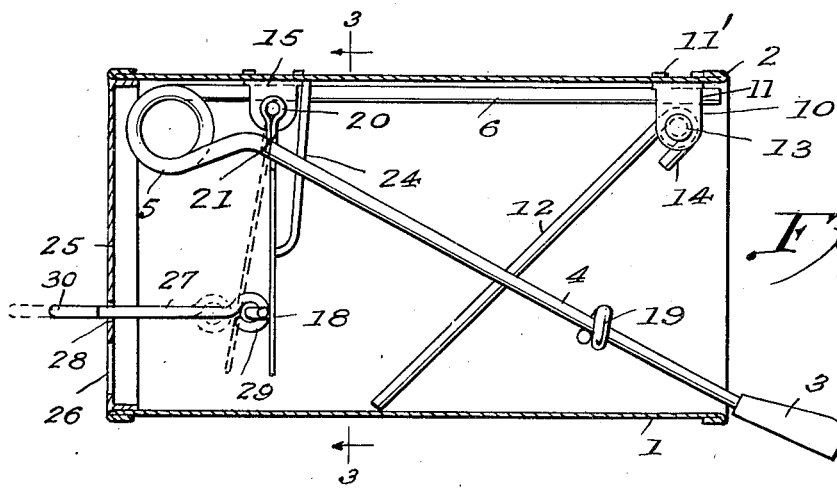
Figure 2 is a similar section to that shown in Figure 1 after the trap has been sprung.

It is also preferable, though not essential to the successful operation of the trap, to provide one end thereof with a closure plate 25 having an air and light opening 26 therein. A "set" indicator or signal rod 27 is also supported in an aperture 28 formed in the end plate 25. This indicator rod is loosely pivoted by means of an eye 29 to the trigger plate 18 and extends outwardly through the plate 25, terminating in an eye 30. Thus, the trapper may see at a glance and without touching the trap whether or not it has been sprung by an animal, for if it has, the trigger plate 18 and rod 27 will be moved to the dotted line positions in Fig. 2.

To set the trap, the operator turns the closed end upwardly and while in this position raises the arm 4 by lifting the enlarged hammer 3. This movement contacts the trigger arm 12 with the transverse rod 19 and raises the arm and swings the plate 18 upwardly until the end of the trigger arm slips into the slot 22 and the plate drops over the end of the arm as shown in Fig. 1. The trap is then placed in an animal burrow or furrow, and when the animal moves through the casing 1 and dislodges the plate 18 and rod 12, the striking arm 4, carrying cross bar 19 and end hammer 3, delivers a tremendously strong killing blow which mercifully and instantaneously executes the trapped rodent.

What I claim is:

1. An animal trap comprising a housing, a coil spring having elongated parallel arms and secured by one of said arms within to the inner wall of said housing, the other free arm of said spring normally resting against the opposite wall of said housing, a transverse cross bar secured to said free arm at a point within said housing, a pivoted trigger bar mounted within said housing adjacent the said fixed spring arm, a pivoted trigger release plate suspended from the said housing adjacent the said coil spring, an opening in said pivoted release plate for the reception of one end of the said trigger bar, the other end of said bar adapted to engage the said transverse cross bar when the said free spring arm is flexed toward the other arm of said spring and the trap is in set position.

2. A trap as set forth in claim 1 wherein the said free elongated arm of said coil spring extends slightly beyond the edge of said housing when said arm is in release position and has a striking hammer member fastened to the end thereof.

3. A trap as set forth in claim 1 wherein a fixed open fork member is secured to the inside of said housing and lies parallel to, but slightly spaced from, said depending pivoted trigger plate, the lower ends of the tines of said fork being bent toward said trigger plate to prevent one way movement thereof, said fork guiding the long arm of said trigger member to engage said aperture in said trigger release plate when the said trap is set.

4. A trap as set forth in claim 1 wherein the said pivoted trigger member and the said pivoted trigger release plate are mounted on pivot pins, said pins being held between the spaced arms of brackets attached to the interior wall of said housing, the fixed elongated arm of said coil spring resting at the base of said brackets and being secured thereto.

5. An animal trap comprising a cylindrical housing, a coil spring having elongated parallel end portions secured by one of said end portions to the interior of said housing, a pivoted trip lever secured to the interior of said housing adjacent the free end of the said secured coil spring end portion, a depending plate having an opening therein pivotally secured to the interior of said housing, the said unsecured end extension of said spring having a cross bar affixed thereto, one end of the said pivoted trip lever being adapted to hold said cross bar while the other end of said trip lever is adapted to be hung over an edge of an aperture formed in said depending plate.

6. A trap as set forth in claim 1, wherein the end of the housing adjacent the coil spring is closed by an apertured plate having a horizontal rod extending therethrough with the inner end of the rod pivotally secured to the trigger release plate.

7. A trap as set forth in claim 5, wherein the end of the housing adjacent the coil spring is blocked by an end plate having an enlarged air and light opening therein adjacent the lower part of the trap and a small opening above the larger opening, a signal rod extending from beyond the end plate through the small opening to the trigger plate whereby the position of the trigger plate may be determined from outside the trap.

FAUCETTE S. RUDOLPH.